US005208092A

United States Patent [19]

Iqbal

[11] Patent Number: 5,208,092

[45] Date of Patent: May 4, 1993

[54] TRANSPARENT LIQUID ABSORBENT MATERIALS FOR USE AS INK-RECEPTIVE LAYERS

[75] Inventor: Mohammad Iqbal, Austin, Tex.

[73] Assignee: Minnesota Mining and Manufacturing Company, St. Paul, Minn.

[21] Appl. No.: 602,793

[22] Filed: Oct. 24, 1990

[51] Int. Cl.$^5$ .................................................. B32B 3/00

[52] U.S. Cl. .................................... 428/195; 428/211; 428/411.1; 428/423.1; 428/424.2; 428/424.4; 428/480; 428/483; 428/913; 346/135.1

[58] Field of Search ............................... 428/195, 211; 346/135.1

[56] References Cited

U.S. PATENT DOCUMENTS

| | | | |
|---|---|---|---|
| 4,300,820 | 11/1981 | Shah | 351/160 |
| 4,369,229 | 1/1983 | Shah | 428/421 |
| 4,503,111 | 3/1985 | Jaeger et al. | 428/195 |
| 4,547,405 | 10/1985 | Bedell et al. | 427/256 |
| 4,554,181 | 11/1985 | Cousin et al. | 427/261 |
| 4,555,437 | 11/1985 | Tanck | 428/212 |
| 4,578,285 | 3/1986 | Viola | 427/209 |
| 4,592,951 | 6/1986 | Viola | 428/323 |
| 4,636,805 | 1/1987 | Toganoh et al. | 346/1.1 |
| 4,642,247 | 2/1987 | Mouri et al. | 427/214 |
| 4,859,570 | 8/1989 | Miller | 430/529 |
| 5,023,129 | 6/1991 | Morganti et al. | 428/411.1 |

FOREIGN PATENT DOCUMENTS

| | | | |
|---|---|---|---|
| 0232040 | 8/1987 | European Pat. Off. | 428/195 |
| 0233703 | 8/1987 | European Pat. Off. | 428/195 |
| 0365307 | 4/1990 | European Pat. Off. | |
| 0297108 | 8/1990 | European Pat. Off. | 428/195 |
| 61-135788 | 6/1986 | Japan | 428/195 |
| 61-230978 | 10/1986 | Japan | 428/195 |
| 61-235182 | 10/1986 | Japan | 428/195 |
| 61-235183 | 10/1986 | Japan | 428/195 |
| 61-261089 | 11/1986 | Japan | 428/195 |
| 61-293886 | 12/1986 | Japan | 428/195 |
| 62-032079 | 2/1987 | Japan | 428/195 |

*Primary Examiner*—Patrick J. Ryan
*Assistant Examiner*—Elizabeth Evans
*Attorney, Agent, or Firm*—Gary L. Griswold; Walter N. Kirn; David L. Weinstein

[57] ABSTRACT

A transparent recording sheet suitable for ink-jet printers' comprising a transparent support bearing on at least one major surface thereof a light transmissive ink-receptive layer containing a hydrophilic polymer crosslinked by polyfunctional aziridine. The recording sheet remains transparent even after ink is absorbed and provides a fast drying, durable, non-tacky transparency suitable for use with an overhead projector.

9 Claims, No Drawings

TRANSPARENT LIQUID ABSORBENT MATERIALS FOR USE AS INK-RECEPTIVE LAYERS

BACKGROUND OF THE INVENTION

1. Field of the Invention

This invention relates to a recording sheet, more particularly, a transparent recording sheet suitable for use with ink-jet printers.

2. Discussion of the Art

Transparencies for use with overhead projectors can be produced by imagewise deposition of liquid ink of various colors onto thin, flexible, transparent polymeric sheets. Such imagewise deposition of ink can be carried out by such apparatus as pen plotters and ink-jet printers. It is desirable that the surface of liquid absorbent transparency materials be tack free to the touch and retain their integrity even after absorption of significant quantities of ink.

During normal use of pen plotters and ink-jet printers, the inks used in such machines are exposed to open air for long periods of time prior to imaging. After such exposure to air, the ink must still function in an acceptable manner, without deterioration, and in particular, without loss of solvent. To meet this requirement, ink formulations typically utilize solvents of very low volatility, such as water, ethylene glycol, propylene glycol, and so on. Inks that contain water or water-miscible solvents are commonly referred to as aqueous inks, and the solvents for these inks used are commonly referred to as aqueous liquids.

Because of the low volatility of aqueous liquids, drying of an image by means of evaporation is very limited. In the case of imaging onto a paper sheet, which has a fibrous nature, a significant amount of the liquid diffuses into the sheet, and the surface appears dry to the touch within a very short time. In the case of imaging onto polymeric film, some means of absorbing aqueous liquids is needed if satisfactory drying of the image is to occur.

Because simple polymeric systems are generally either limited in absorbency or in structural integrity, compositions useful as transparent liquid absorbent materials have been formed by blending a liquid-insoluble or low absorbent material with a liquid-soluble, or high absorbent material. The liquid-insoluble material is presumed to form a matrix, within which the liquid soluble material resides, so as to preserve both the properties of absorbency and structural integrity. Examples of such blends are disclosed in U.S. Pat. Nos. 4,300,820 and 4,369,229, wherein the matrix forming polymer is a terpolymer comprising hydrophobic monomeric units, hydrophilic monomeric units, and acid-containing monomeric units, with the water-soluble portions of the compositions being polyvinyl lactams.

Other examples of blends comprising water-soluble and water-insoluble polymeric compositions are disclosed in European Patent Application No. EP 0 233 703, wherein water-insoluble acrylic polymers having acid functionality are blended with polyvinyl pyrrolidone for use as ink-receptive layers on films to be imaged by ink-jet printers or pen plotters.

A problem that frequently arises in the formulation of polymer blends is the incompatibility of the polymers being blended. It is well-known that polymeric materials having widely different properties generally tend to be incompatible with one another. When attempts are made to blend polymers that are incompatible, phase separation occurs, resulting in haze, lack of transparency, and other forms of inhomogeneity.

Compatibility between two or more polymers in a blend can often be improved by incorporating into the liquid-insoluble matrix-forming polymer chains monomeric units that exhibit some affinity for the liquid-soluble polymer. Polymeric materials having even a small amount of acid functionality, as in the patents cited previously, are more likely to exhibit compatibility with polyvinyl lactams than would polymers not having acid functionality. Generally, the compatibility of polymers being blended is improved if the polymers are capable of hydrogen bonding to one another.

A second form of incompatibility noted in using blends of liquid-absorbent polymers is the incompatibility of the matrix-forming insoluble polymer with the liquid being absorbed. For example, if the liquid being absorbed is water, and if the water-insoluble polymers are hydrophobic, some inhibition of water absorption ability can be expected. One method of overcoming this difficulty is to utilize hydrophilic matrix polymers that are water-insoluble at the temperatures at which they are to be used, though they may be water-soluble at a different temperature. In U.S. Patt. No. 4,503,111, ink-receptive coatings comprising either poly(vinyl alcohol) or gelatin blended with polyvinyl pyrrolidone are disclosed. Both poly(vinyl alcohol) and gelatin, being water-insoluble at room temperature, are able to act as matrix-forming polymers for these coatings, and the coatings are quite receptive to aqueous inks. However, the coatings do exhibit a tendency to become tacky, either because of imaging, or because of high humidity.

It therefore becomes clear that while blends of soluble and insoluble polymers may be useful as liquid absorbent compositions, they suffer major limitations in liquid absorption ability and in durability. It would be desirable to provide a single polymeric system that can absorb sufficient amounts of liquid to give a fast drying, non-tacky coating, while maintaining all other desirable properties.

SUMMARY OF THE INVENTION

This invention provides a recording sheet comprising a transparent support bearing on at least one major surface thereof a transparent ink-receptive layer comprising:

(1) from about 92 to about 99.5% by weight of a water-soluble copolymer comprising:

- (a) from about 0.5 to about 20% by weight of at least one ethylenically unsaturated monomer having acidic groups, up to 100% of said acidic groups being present as an ammonium salt or a salt prepared from a volatile amine;
- (b) from about 10 to about 99.5% by weight of at least one monomer selected from the group consisting of polar compounds containing nitrogen groups such as vinyl lactams and acrylamides; and
- (c) up to about 70% by weight of a hydrophilic, ethylenically unsaturated alkylester; and (2) from about 0.5 to about 8% by weight of a polyfunctional aziridine crosslinking agent; said ink-receptive layer having been crosslinked after being coated onto said support.

When imaged with an aqueous ink, the recording sheet gives a fast drying, non-tacky image area while maintaining high durability and optical clarity.

DETAILED DESCRIPTION OF THE INVENTION

Materials that are suitable for the transparent support can be any transparent, polymeric material, preferably one selected from polyesters, e.g., polyethylene terephthalate, cellulose acetates, polycarbonates, polyvinyl chlorides, polystyrenes, polysulfones, blends of the foregoing, multi-layered films made from the foregoing polymeric materials, and combinations thereof. For ink-jet printing, the preferred polymeric film is polyethylene terephthalate having a thickness of about 50 to 125 micrometers.

The composition for preparing the ink-receptive layer comprises a water-soluble copolymer and a polyfunctional aziridine crosslinking agent. As used herein, the term "copolymer" means a polymer formed from two or more different monomeric units. Terpolymers are within the scope of the definition of copolymers. The water-soluble copolymer can be formed from two or more types of monomeric units. At least one of the monomeric units can be provided by any ethylenically unsaturated monomer having acidic groups, such as:

(a) acrylic acid, methacrylic acid, p-styrene sulfonic acid, 2-acrylamido-2-methyl propane sulfonic acid;
(b) quaternary ammonium salts of acids described in (a);
(c) salts prepared from a volatile amine of acids described in (a); and
(d) ammonium salts of acid monomers having the structure:

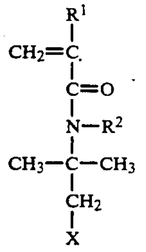

wherein $R^1$ represents H or $-CH_3$, $R^2$ represents H or an alkyl group having up to 10 carbon atoms, and X represents $-COONH_4$ or $-SO_3NH_4$.

At least one of the monomeric units can be selected from:

(a) vinyl lactams having the repeating structure:

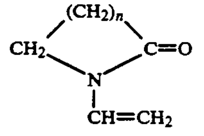

wherein n represents the integer 2 or 3, the preferred monomer being N-vinyl-2-pyrrolidone.

(b) amides, such as acrylamide or methacrylamide, having the structure:

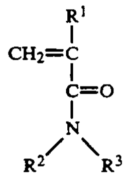

wherein $R^1$ and $R^2$ are as described previously, and $R^3$ represents H, alkyl group having up to 10 carbon atoms, preferably having from 1 to 4 carbon atoms, hydroxyalkyl group, or alkoxyalkyl group having the structure $-(CH_2)_m-OR^2$ where m represents an integer from 1 to 3, inclusive, and $R^2$ is as described previously.

For a terpolymer, a specific type of copolymer, a third monomeric unit is employed. This third monomeric unit can be a hydrophilic ethylenically unsaturated alklyl ester, such as (a) alkoxy alkylacrylates, hydroxy alkylacrylates, alkoxy alkylemthacrylates, or hydroxy alkylmethacrylates having the structure:

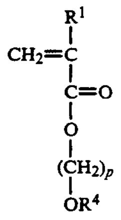

wherein p represents an integer from 1 to 4, inclusive, preferably 2 or 3, $R^1$ is as described previously, and $R^4$ represents H or alkly group having 1 to 4 carbon atoms; or (b) alkoxy acrylates or alkoxy methacrylates having the structure:

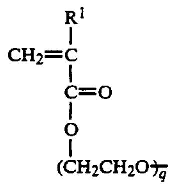

wherein q represents an integer from 5 to 25, inclusive, and $R^1$ is as described previously.

The preferred corsslinking agent is a polyfunctional aziridine such as trimethylolpropane-tris-(β-(N-aziridinyl)propionate)

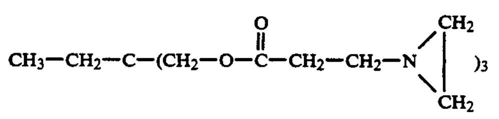

pentaerythritol-tris-(β-(N-aziridinyl)propionate)

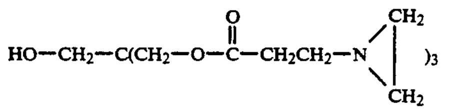

trimethylolpropane-tris-(β-(N-methylaziridinyl propionate)

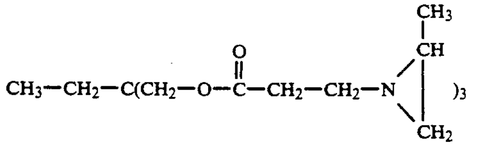

and the like, so long as they have at least two crosslinking sites in each molecule.

The crosslinking agent typically comprises from about 0.5% to about 8% by weight of the composition for preparing the ink-receptive layer, more preferably from, about 1% to about 6% by weight. At a level of below about 0.5% by weight, the crosslinking density is too low, adversely affecting both image quality and coating integrity. At a level above about 8% by weight, crosslinking density is too high, resulting in low ink absorption.

The water-soluble copolymer is typically formed by free radical, emulsion, or suspension polymerization techniques in an aqueous or an organic medium, preferably water. From about 0.01 to about 2.0% by weight (based on total weight of monomers) of a free radical initiator is typically employed. Polymerization can be carried out at a temperature of from about 25° C. to reflux temperature, depending on the initiator and the polymerization technique. In general, the copolymer thus made can be mixed with an appropriate amount of polyfunctional aziridine crosslinking agent to form an aqueous coating solution, containing from about 5 to about 10% by weight solids. The solution can be coated by conventional means, e.g., knife coating, rotogravure coating, reverse roll coating, or the like, onto a transparent support and dried at a temperature of about 200° F. for three to four minutes. Drying can be accomplished by means of heated air.

Crosslinking takes place during the drying process to form a transparent ink-receptive layer of a crosslinked polymeric network. This process can be schematically depicted as follows:

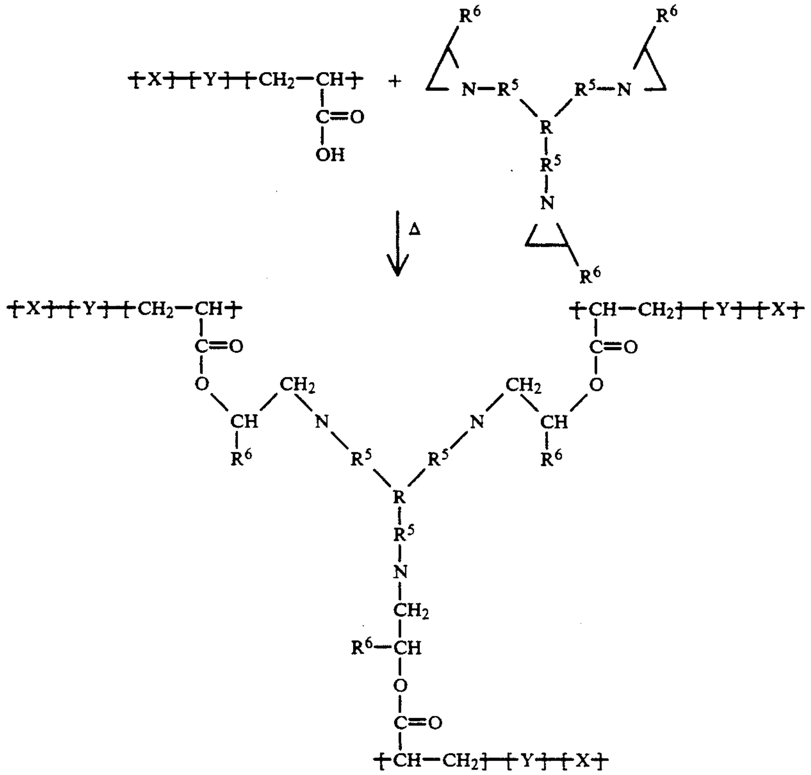

Wherein X and Y represent hydrophilic monomers, as described previously, R represents $CH—CH_2—C—$ or $HO—CH_2—C—$, $R^5$ represents

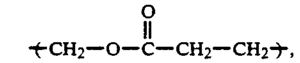

$R^6$ represents H or $CH_3$.

Solutions for forming the ink-receptive layer of the present invention can also contain certain additional modifying ingredients, such as adhesion promoters, particles, surfactants, viscosity modifiers, and like materials, provided that such additives do not adversely affect the ink-receptivity of the layer.

If preferred, an adhesion promoting priming layer can be interposed between the ink-receptive layer and the transparent support. Such an adhesion promoting layer can include chemical priming coatings and surface treatments, such as corona treatment. Adhesion of the ink-receptive layer can also be promoted by interposing between the priming layer and the ink-receptive layer a gelatin sublayer of the type used in photographic film backings. Film backings having both a priming layer and a gelatin sublayer are commercially available, and are frequently designated as primed and subbed film backings.

Recording sheets of the present invention particularly useful for ink-jet printing can have the ink-receptive layer thereof overcoated with an ink-permeable, anti-tack protective layer, such as, for example, a layer comprising poly(vinyl alcohol) in which starch particles have been dispersed. This overcoat layer can also provide surface properties to aid in properly controlling the spread of ink droplets to improve image quality.

In order to illustrate the various embodiments of the present invention, the following non-limiting examples are provided.

EXAMPLE 1

A hydrophilic polymer was made by mixing N-vinyl-2-pyrrolidone (37.5 parts by weight), acrylamide (10.0 parts by weight), ammonium salt of acrylic acid (2.5 parts by weight, 6.3 g of 40% solution in water), azo-bis-isobutyronitrile (0.07 part by weight, "Vazo", E. I. DuPont de Nemours and Co.), and deionized water (283 parts by weight) in a 500 ml bottle. The mixture was purged with nitrogen gas for 10 to 15 minutes; then the bottle was immersed in a bath having a constant temperature of 60° C. and the mixture allowed to react, i.e., polymerize, for about 18 hours. After the reaction was completed, the viscous resin that was obtained was then diluted with 100 g of deionized water to give a solution containing 10.7% solids. The conversion was calculated to be about 92%.

A portion of the resin solution (15.37 g) was further diluted with deionized water (10 g). The pH of the solution was at 7, and was increased to 8 by adding a few drops of a dilute ammonium hydroxide solution. Polyfunctional aziridine (0.034 g, having a functionality of ~3.3, XAMA-7, available from Sanncor Ind., Inc.) dissolved in 1.0 ml of methanol was then added to the solution, and the solution was thoroughly mixed on a roller mill prior to being coated onto a 0.1 mm primed and subbed polyethylene terephthalate film ("Scotchpar" Type PH primed and subbed film, available from Minnesota Mining and Manufacturing Company) at a wet thickness of 0.125 mm. The coating was then dried in an oven at a temperature of 200° F. for four minutes.

The coated film was imaged by a Hewlett-Packard Desk Jet ink-jet printer. The ink dried in about 30 seconds and exhibited very little tack.

COMPARATIVE EXAMPLE A

The film of this example was made in the same manner as was that of Example 1, except that no crosslinking agent was added. The coated film was agin imaged by a Hewlett-Packard Desk Jet ink-jet printer and the ink remained tacky for 10 mintues.

EXAMPLE 2 AND COMPARATIVE EXAMPLE B

A hydrophilic polymer was made by mixing N'N-dimethylacrylamide (32.5 parts by weight, Aldrich Chemical Co.), methoxy ethyl acrylate (15.0 parts by weight, CPS Chemical Co.), ammonium salt of acrylic acid (2.5 parts by weight), azo-bis-isobutyronitrile (0.07 parts by weight, "Vazo"), and deionized water (283.3 parts by weight) in a 500 ml bottle. The mixture was purged with nitrogen gas for 10 minutes and then polymerized for 18 to 24 hours at a temperature of 60° C. The polymerized material was diluted with deionized water to give a solution containing 7% solids.

The following formulations were then prepared.

| Example no. | Ingredient | Amount (g) |
|---|---|---|
| 2 | Hydrophilic polymer (7% solids) | 20.0 |
| | Surfactant (2% solution in water, "Triton X100", available from Rohm and Haas) | 0.3 |
| | Crosslinking agent (10% solution in water, XAMA-7) | 0.95 |
| Comparative B | Hydrophilic polymer (7% solids) | 20.0 |
| | Surfactant (2% solution in water, "Triton X100") | 0.3 |

These formulations were coated onto a 4 mil gelatin subbed polyethylene terephthalate film at 0.15 mm wet thickness and dried at a temperature of 200° F. for five minutes. Both films were imaged by a Hewlett-Packard Desk Jet ink-jet printer. The coating containing a crosslinking agent gave a good image that dried within 90 seconds to a tack-free state. The coating that did not contain a crosslinking agent remained tacky for more than 10 minutes.

EXAMPLE 3

A mixture of N-vinyl-2-pyrrolidone (16.0 parts by weight, GAF Corporation), methacrylamide (16.0 parts by weight), 2-hydroxyethyl methyl acrylate (7.5 parts by weight), methoxyethyl methacrylate (7.5 parts by weight), ammonium salt of acrylic acid (2.5 parts by weight), azo-bis-isobutyronitrile (0.07 parts by weight, "Vazo"), isopropyl alcohol (8.0 parts by weight), and deionized water (276 parts by weight) was introduced into a 500 ml bottle. The mixture was purged with nitrogen gas for 10 to 15 minutes and then polymerized at a temperature of 60° C. for 8 to 10 hours. The resin obtained was diluted with deionized water to give a solution containing 7.0% solids.

A portion of the resin solution (20.0 g) was mixed with surfactant (0.3 g of a 2.0% solution in water, "Triton X100") and crosslinking agent (1.4 g of a 10.0% solution in water, XAMA-7). The solution was then coated onto 0.1 mm primed and subed polyethylene terephthalate film at a 0.15 mm wet thickness and dried in an oven at a temperature of 95° C. for five minutes. The film was then imaged by Hewlett-Packard 7550A Graphic Printer pen plotter. The colored images were bright, and they dried quickly without bleeding, picking, or pen clogging. Various modifications and alterations of this invention will become apparent to those skilled in the art without departing from the scope and spirit of this invention, and it should be understood that this invention is not to be unduly limited to the illustrative embodiments set forth herein.

What is claimed is:

1. A recording sheet comprising a transparent support bearing on at least one major surface thereof a transparent ink-receptive layer comprising:

(1) from about 92 to about 99.5% by weight of a water-soluble copolymer; and (2) from about 0.5 to about 8% by weight of a polyfunctional aziridine crosslinking agent;

said water-soluble copolymer having been crosslinked after being coated onto said support.

2. A recording sheet comprising a transparent support bearing on at least one major surface thereof a transparent ink-receptive layer comprising:

(1) from about 92 to about 99.5% by weight of a water-soluble copolymer; and (2) from about 0.5 to about 8% by weight of a polyfunctional aziridine crosslinking agent said water-soluble copolymer having been crosslinked after being coated onto said support, said water-soluble copolymer comprising:

(a) from about 0.5 to about 20% by weight of at least one ethylenically unsaturated monomer having acidic groups, up to 100% of said acidic groups being present as an ammonium salt or a salt prepared from a volatile amine;

(b) from about 10 to about 99.5% by weight of at least one monomer selected from the group consisting of polar compounds containing nitrogen groups; and (c) up to about 70% by weight of a hydrophilic, ethylenically unsaturated alkylester.

3. The recording sheet of claim 2, wherein said at least one ethylenically unsaturated monomer having acidic groups are selected from the group consisting of:

(a) acrylic acid, methacrylic acid, p-styrene sulfonic acid, 2-acrylamido-2-methyl propane sulfonic acid;

(b) quaternary ammonium salts of acids described in (a);

(c) salts prepared from a volatile amine of acids described in (a); and (d) ammonium salts of acid monomers having the structure:

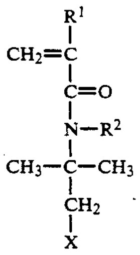

wherein $R^1$ represents H or $—CH_3$, $R^2$ represents H or an alkyl group having up to 10 carbon atoms, and X represents $—COONH_4$, or $—SO_3NH_4$.

4. The recording sheet of claim 2, wherein said polar compounds containing nitrogen groups are selected from the group consisting of:

(a) vinyl lactams having the repeating structure:

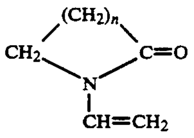

wherein n represents the integer 2 or 3, and (b) amides, having the structures:

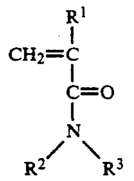

wherein $R^1$ represents H or $—CH_3$, $R^2$ represents H or an alkyl group having up to 10 carbon atoms, and $R^3$ represents H, alkyl group having up to 10 carbon atoms, hydroxyalkyl group, or alkoxyalkyl group having the structure $—(CH_2)_m—OR^2$ where m represents an integer from 1 to 3, inclusive.

5. The recording sheet of claim 4, wherein said polar compound is N-vinyl-pyrrolidone.

6. The recording sheet of claim 2, wherein said hydrophilic, ethylenically unsaturated alkylester is selected from the group consisting of:

(a) alkoxy alkylacrylates, hydroxy alkylacrylates, alkoxy alkylmethacryaltes, or hydroxy alkylmethacrylates having the structure:

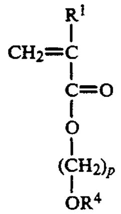

wherein p represents an integer from 1 to 4, inclusive, $R^1$ represents H or $—CH_3$, and $R^4$ represents H or alkyl group having 1 to 4 carbon atoms; and (b) alkoxy acrylates or alkoxy methacrylates having the structure:

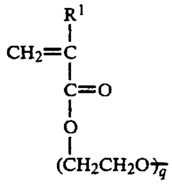

wherein q represents an integer from 5 to 25, inclusive, and $R^1$ represents H or $—CH_3$.

7. The recording sheet of claim 1, wherein said polyfunctional aziridine crosslinking agent is selected from the group consisting of trimethylolpropane-tris-(β-(N-aziridinyl)propionate), pentaerythritol-tril-(β-(N-aziridinyl)propionate), and trimethylolpropane-tris-(β-(N-methylaziridinyl propionate).

8. The recording sheet of claim 1, wherein the weight of said polyfunctional aziridine crosslinking agent ranges from about 1.0 to about 6.0% by weight of the layer.

9. The recording sheet of claim 1, wherein said transparent support is a polyester film.

* * * * *

UNITED STATES PATENT AND TRADEMARK OFFICE

CERTIFICATE OF CORRECTION

PATENT NO. : 5,208,092

DATED : May 4, 1993

INVENTOR(S) : Iqbal

It is certified that error appears in the above-identified patent and that said Letters Patent is hereby corrected as shown below:

Title page, item [57] Abstract, lines 1 and 2, "printers' comprising" should be --printers comprises--.

Col. 6, line 40, "$CH-CH_2-C-$" should be --$CH_3-CH_2-C-$--.

Col. 7, line 48, "agin" should be --again--.

Signed and Sealed this

First Day of February, 1994

Attest:

Bruce Lehman

BRUCE LEHMAN

*Attesting Officer* *Commissioner of Patents and Trademarks*